United States Patent
Perlo et al.

(10) Patent No.: US 6,932,030 B2
(45) Date of Patent: Aug. 23, 2005

(54) MICROGENERATOR OF ELECTRICAL ENERGY

(75) Inventors: Piero Perlo, Sommariva Bosco (IT);
Gianfranco Innocenti, Rivalta (IT);
Gianluca Bollito, Turin (IT);
Bartolomeo Pairetti, Barge (IT);
Alessandro Zanella, Turin (IT);
Cosimo Carvignese, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 13 days.

(21) Appl. No.: 10/429,716

(22) Filed: May 6, 2003

(65) Prior Publication Data

US 2004/0079301 A1 Apr. 29, 2004

(30) Foreign Application Priority Data

May 7, 2002 (IT) ...................................... TO2002A0375

(51) Int. Cl.⁷ .............................................. F02B 71/00
(52) U.S. Cl. .................................... 123/46 R; 123/46 E
(58) Field of Search ............................. 123/46 R, 46 E

(56) References Cited

U.S. PATENT DOCUMENTS

| 3,105,153 A | 9/1963 | James, Jr. |
| 5,437,255 A | 8/1995 | Sadley et al. |
| 6,109,222 A | 8/2000 | Glezer et al. |

FOREIGN PATENT DOCUMENTS

| DE | 32 24 723 A1 | 1/1984 |
| EP | 0 999 055 A2 | 5/2000 |
| WO | WO 01/92715 A1 | 12/2001 |

*Primary Examiner*—Noah P. Kamen
(74) *Attorney, Agent, or Firm*—Sughrue Mion, PLLC

(57) ABSTRACT

Described herein is a microgenerator of electrical energy with a high power density, which uses an internal-combustion micromotor with two combustion chambers set opposite to one another, within which a piston is displaced with reciprocating motion. The piston is at least in part made of magnetic material and is wound with a coil, within which is generated an electric current by induction. The fuel, the oxidant, and preferably a catalyst, are injected into each of the two combustion chambers by means of injectors that are substantially of the same type as those used in ink-jet printer heads. The dimensions of the device are comparable to those of a 1.5-V NiCd battery of a traditional standard type.

10 Claims, 2 Drawing Sheets

MICROGENERATOR OF ELECTRICAL ENERGY

BACKGROUND OF THE INVENTION

The present invention relates to the field of microgenerators of electrical energy. In particular, the invention regards a microgenerator designed for a wide range of different applications, and having a high degree of efficiency and in particular a high power density. A preferred example of application regards the use of the microgenerator according to the invention for the supply of portable electronic apparatuses. In this field, it is of primary importance to provide a power density (power/mass ratio [power]) that is as high as possible. The solutions up to now proposed in the art are not completely satisfactory from this standpoint.

Miniaturized solar cells and lithium microbatteries have been proposed as integrated power sources for MEMS applications. The estimated power density of said embodiments is in the region of 1 MW/m$^3$. Solid-state lithium microbatteries of a rechargeable type have a power density in the region of 0.4 MW/m$^3$.

Electric micromotors have a power density in the region of 1.7 MW/m$^3$. The magnetic micromotors manufactured by Ahn and Allen (Proc. Microelectrical Mechanical Systems, IEEE Robotics and Automation Society, pp 1–6, 1993) have a power density of 200 MW/m$^3$.

Chemical reactors are not designed for the generation of energy, but an exothermal reaction of partial oxidation can generate a non-negligible amount of energy. The T microreactor illustrated by Jensen et al. (Microreaction Technology, Proceedings of the First International Conference on Microreaction Technology, 1997), used for studying the catalytic oxidation of ammoniac had a power density in the region of 20 MW/m$^3$.

There have also been used conventional devices for generating energy on a small scale. For example, metal-channel flow reactors, which use controlled $H_2$—$O_2$ reactions, have been used as heat exchangers and evaporators. In particular, with a Pt-catalysed $H_2$—$O_2$ reaction there has been reported a power density of 150 MW/m$^3$ (Hagendorf; Process Miniaturization: 2nd International Conference on Microreaction Technology, Topical conference reprints, 1998).

The heart of a polymeric-electrolytic-membrane fuel cell (PEMFC) is the membrane-electrode assembly (MEA) made up of catalysed anode and cathode electrodes joined or applied on a side of a membrane made of solid polymeric electrolyte. In a direct methanol fuel cell (DMFC), the methanol can be oxidized directly into carbon dioxide and water on the catalytically active anode without any equipment for pre-treatment of the fuel. The main advantage of the DMFC is the elimination of the fuel processor: this gives rise to a simpler operation and to an operation presenting greater reliability, smaller volume and lower operating costs. Surampudi et al. (J. Power Sources, 47 vol. 377, 1994) has produced a high-performance DMFC at a temperature of 88° C. with a concentration of 2 M of methanol. Shukla et al. (J. Power Sources, 55, vol. 88, 1995) and Arico et al. (J. Electroch. Soc., 143, vol. 3950, 1996) have achieved a power density of around 200 MW/cm$^3$ at 900° C.

A modern turbine engine for aircraft, with a fuel flow rate of 4 kg/s produces approximately 150 MW of power in a typical combustion chamber of 0.1 m$^3$. This corresponds to a power density of 1500 MW/m$^3$.

The silicon microcombustor, as proposed for the first time at the Massachusetts Institute of Technology, which is characterized by a power density of 2300 MW/m$^3$, is obtained using micro-electronics technologies with a complex process, which involves 7 aligned-wafer connections, 20 lithography steps, and the deposition of 9 thin-film layers.

The main engine of the Space Shuttle, with a flow rate of hydrogen fuel of 75 kg/s, produces approximately 9000 MW of power. Using a combustion-chamber volume of 0.13 m$^3$, the resultant power density is 70000 MW/m$^3$.

The purpose of the present invention is to provide a microgenerator of electrical energy which is characterized by a high power density, for example in a band which ranges from 1000 to 10000 MW/m$^3$.

SUMMARY OF THE INVENTION

According to its most essential scheme, the microgenerator of the present invention is characterized in that it comprises an internal-combustion micromotor, which includes at least one combustion chamber, a piston facing said combustion chamber, means for feeding a fuel and an oxidant into the combustion chamber, means for causing cyclically an explosion in the combustion chamber and means for transforming the mechanical energy exerted on the piston into electrical energy, in which said means of supply are injector means substantially of the same type as those used in ink-jet printer heads.

The choice of an injection system functioning in a pulsed way is justified by the experimental finding that the power density may in this way be increased up to five times with respect to an operation in a non-pulsed, i.e., continuous, way.

In a preferred of embodiment, the microgenerator comprises a cylinder, within which is slidably mounted the piston and two combustion chambers facing the two opposite ends of the piston, within which the explosions are alternately caused, in such a way as to generate a reciprocating motion of the piston. The aforesaid means for transformation of mechanical energy of the piston into electrical energy comprise a coil englobed in the cylinder and wound around the piston, said piston being made up, at least in part, of a magnet, the reciprocating movement of which within the coil generates an electric current induced in the circuit of the coil.

Once again according to a further preferred characteristic of the invention, the microgenerator presents injectors of the ink-jet type, separate for the oxidant and for the fuel. In addition, preferably, the microgenerator presents injectors substantially of the same type as those used in ink-jet printer heads also for the supply of a catalyst of combustion within the combustion chamber.

The means for generating the explosion preferably comprise nanoporous explosive particles embedded in the fuel. The fuel is, for example, chosen from among hydrogen or a mixture of air and a hydrocarbon compound. The oxidant is, for example, chosen between air and hydrogen dioxide.

The operation of the injectors is controlled by an electronic control system, which synchronizes the injectors and the corresponding microvalves.

The body of the cylinder is preferably made of ceramic material, for example consisting of a carbon and silicon nitride (SiCN). Obviously, there is moreover provided an electronic circuit for conditioning the electrical output across the circuits of the coil within which the piston moves.

Thanks to the characteristics referred to above, the microgenerator according to the invention is characterized by a series of advantages. Above all, it enables a high level of portability. It is able to produce high powers with a very small volume, this thanks to the fact that each stroke of the piston is effective for the production of energy, unlike what occurs in internal-combustion motors of a traditional type.

The piston is preferably made up of a pack of disks made of magnetic material resistant to high temperatures, which terminates at each end with at least one disk made of non-magnetic material. The end disks are thus able to resist better the high temperatures in the combustion chambers.

The dimensions may be very small. For example, it is possible to envisage a piston having a diameter of approximately 2 mm and a length of 35 mm. The magnetized central part of the piston may be approximately 25 mm long. The coil incorporated in the wall of the cylinder may have a total length of approximately 35 mm. The entire module may have a dimension of approximately 60–70 mm and a maximum diameter of approximately 8 mm (very similar to the dimension of a typical 1.5-V NiCd battery). With dimensions of this sort it is possible to envisage a generation of power of up to 20 W and over, with energy-density values consequently of between 2000 and 10000 MW/m$^3$.

In order to limit possible negative consequences deriving from the rapid transfer of heat and from the reduced volume of the chamber of the microcombustor, the internal walls of the combustor are isolated preferably with coatings of nano-granular doped zirconia functioning as a thermal barrier. Such coatings present a low conductivity and a high chemical stability at high temperatures.

As already referred to above, drops of fuel and nanoparticles of catalyst are injected into the combustion chamber by means of a technology of the ink-jet type. As already mentioned, the choice of the injection system in a pulsed mode emerges from the experimental evidence, which demonstrates that in this way the power density increases considerably.

BRIEF DESCRIPTION OF THE DRAWINGS

The synchronization of the pulses between the two combustion chambers has various positive effects: (i) a better control of the dissipated heat and; (ii) an optimized combination between combustion volumes and magnetic piston. A schematic example of embodiment of the invention is illustrated in the annexed drawings, in which.

DETAILED DESCRIPTION OF THE DRAWINGS

Figure 1:
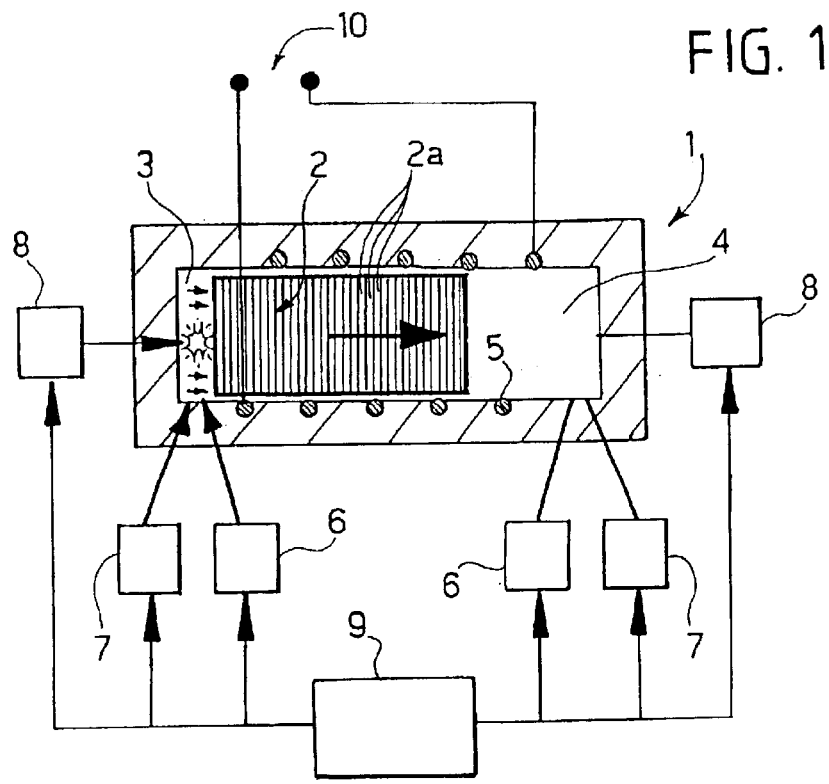
FIGS. 1 and 2 illustrate a schematic cross-sectional view of a preferred embodiment of the microgenerator in two different conditions of the operating cycle.
Figure 2:
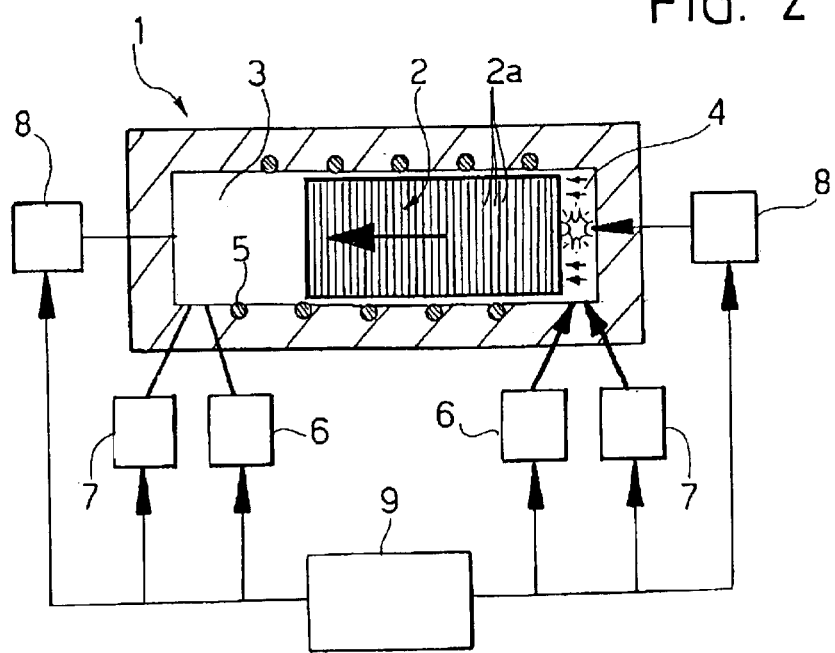

In the annexed drawings, the reference number 1 designates, as a whole, the body of a cylinder, within which there is slidably mounted in a reciprocating way a piston 2. Inside the cylinder 1 there are obtained two combustion chambers 3, 4, one facing one end of the piston 2 and the other facing the opposite end of the piston 2. The piston 2, as already mentioned more than once, is made up of a pack of disks 2a made of magnetic material, except for the two end disks, which are made of non-magnetic material, so as to be made of a material that is more resistant to the high temperature of the combustion chambers 3, 4.

In the wall of the cylinder 1 is embedded a coil 5, which is wound around the piston 2 and at the ends of which 10 there may be collected the electric current generated by induction from the reciprocating movement of the magnetic piston 2.

Figure 3:
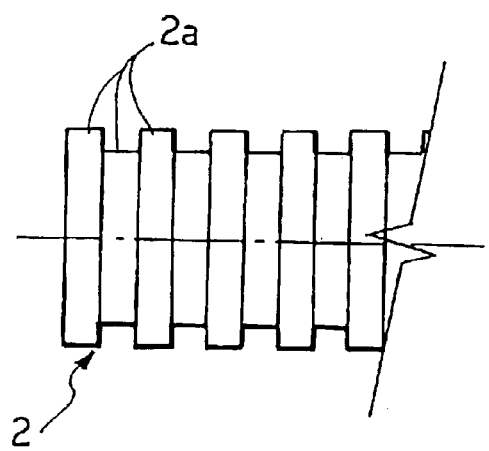
FIGS. 3 and 4 illustrate, respectively, a partial side view and a partial cross-sectional view of a variant of the piston of the microgenerator.
Figure 4:
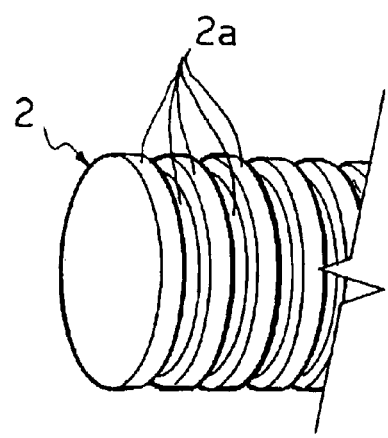

Injected into the two combustion chambers are fuel, oxidant and catalyst. The reference numbers 6, 7, 8 designate, respectively, the injectors for fuel, oxidant and catalyst which, as already mentioned more than once, are built according to the technology used for ink-jet printer heads. Of course, the representation illustrated is purely schematic, it being evident that the way in which the ink-jet heads are arranged and/or possibly associated with one another may be any whatsoever. The use of the catalyst is moreover preferential but not essential. Finally, mixed in the fuel are explosive nanoporous particles for generating the explosion. The reference number 9 designates a control unit which controls synchronization of the heads 6, 7, 8 for bringing about the explosion alternately in the combustion chambers 3 and 4 for the purpose of obtaining the reciprocating movement of the piston 1. FIGS. 3 and 4 illustrate a variant embodiment of the piston, in which the disks 2a alternatively have a different diameter in order to give rise to a segmented conformation of the piston, which may lead to an improvement in the efficiency of the device.

Of course, without prejudice the principle of the invention, the details of construction and the embodiments may vary widely with respect to what is described and illustrated herein purely by way of example, without thereby departing from the scope of the present invention.

What is claimed is:

1. A microgenerator of electrical energy comprising an internal-combustion micromotor, which includes at least one combustion chamber, a piston facing said chamber, means for feeding a fuel and an oxidant into the combustion chamber, means for causing cyclically an explosion in the combustion chamber, and means for transforming the mechanical energy exerted on the piston into electrical energy, in which said means of supply are injector means, wherein the means for generating the explosion comprise nanoporous explosive particles embedded in the fuel.

2. The microgenerator according to claim 1, wherein the micromotor comprises a cylinder, within which is slidably mounted the piston, and two combustion chambers facing the two opposite ends of the piston, within which there are caused alternately the explosions, in such a way as to generate a reciprocating movement of the piston.

3. The microgenerator according to claim 1, wherein the means for transformation of the mechanical energy of the piston into electrical energy comprise a coil englobed in the cylinder and wound around the piston, said piston being made up, at least in part, of a magnet, the reciprocating movement of which within the coil generates a current induced in the circuit of the coil.

4. The microgenerator according to claim 1, wherein the body of the cylinder is made of ceramic material preferably SiCN.

5. A microgenerator of electrical energy comprising an internal-combustion micromotor, which includes at least one combustion chamber, a piston facing said chamber, means for feeding a fuel and an oxidant into the combustion chamber, means for causing cyclically an explosion in the combustion chamber, and means for transforming the mechanical energy exerted on the piston into electrical energy, in which said means of supply are injector means, wherein the injector means includes separate injectors of the ink-jet type for supplying the oxidant and the fuel, respectively.

6. The microgenerator according to claim 1, wherein the injector means includes injectors for the supply of a catalyst of combustion within the combustion chamber.

7. The microgenerator according to claim 1, wherein the fuel is chosen from among hydrogen and a mixture of air and a hydrocarbon compound.

8. The microgenerator according to claim 1, wherein the oxidant is chosen between air and hydrogen dioxide.

9. A microgenerator of electrical energy comprising an internal-combustion micromotor, which includes at least one combustion chamber, a piston facing said chamber, means for feeding a fuel and an oxidant into the combustion chamber, means for causing cyclically an explosion in the combustion chamber, and means for transforming the mechanical energy exerted on the piston into electrical energy, in which said means of supply are injector means,
  wherein the injector means includes injectors for the supply of a catalyst of combustion within the combustion chamber, and
  wherein the catalyst is in the form of nanoparticles.

10. A microgenerator of electrical energy comprising an internal-combustion micromotor, which includes at least one combustion chamber, a piston facing said chamber, means for feeding a fuel and an oxidant into the combustion chamber, means for causing cyclically an explosion in the combustion chamber, and means for transforming the mechanical energy exerted on the piston into electrical energy, in which said means of supply are injector means,
  wherein the means for transformation of the mechanical energy of the piston into electrical energy comprise a coil englobed in the cylinder and wound around the piston, said piston being made up, at least in part, of a magnet, the reciprocating movement of which within the coil generates a current induced in the circuit of the coil, and
  wherein the piston comprises a pack of disks made of magnetic material resistant to high temperatures, which terminates at each end with at least one disk made of non-magnetic material resistant even higher temperatures.

* * * * *